US009317881B1

(12) United States Patent
Ledterman et al.

(10) Patent No.: US 9,317,881 B1
(45) Date of Patent: Apr. 19, 2016

(54) SYSTEMS AND METHODS FOR GENERATING INTERACTIVE CONTENT FOR IN-PAGE PURCHASING

(71) Applicant: Adorno Publishing Group, Inc., Aptos, CA (US)

(72) Inventors: Sara Ledterman, Aptos, CA (US); Arif Jan Jensen, Berlin (DE)

(73) Assignee: ADORNO PUBLISHING GROUP, INC., Aptos, CA (US)

( * ) Notice: Subject to any disclaimer, the term of this patent is extended or adjusted under 35 U.S.C. 154(b) by 0 days.

(21) Appl. No.: 14/855,004

(22) Filed: Sep. 15, 2015

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0641* (2013.01)

(58) Field of Classification Search
CPC ................. G06Q 30/0641; G06Q 30/0643
USPC ........................... 705/26.8, 27.1, 27.2
See application file for complete search history.

(56) References Cited

U.S. PATENT DOCUMENTS

| 8,121,902 | B1 * | 2/2012 | Desjardins | G06Q 30/0282 705/26.1 |
| 2002/0049637 | A1 * | 4/2002 | Harman | G06Q 30/02 705/26.1 |
| 2002/0143662 | A1 * | 10/2002 | Clark | G06Q 30/06 705/26.8 |
| 2003/0110100 | A1 * | 6/2003 | Wirth, Jr. | G06Q 30/02 705/27.2 |
| 2007/0271149 | A1 * | 11/2007 | Siegel | G06Q 30/0603 705/26.41 |
| 2007/0271156 | A1 * | 11/2007 | Sarusi | G06Q 30/0226 705/14.27 |
| 2008/0097871 | A1 * | 4/2008 | Williams | G06Q 20/10 705/500 |
| 2008/0228595 | A1 * | 9/2008 | Hill | G06Q 30/0603 705/26.41 |
| 2010/0211900 | A1 * | 8/2010 | Fujioka | A63F 13/12 715/765 |
| 2011/0004533 | A1 * | 1/2011 | Soto | G06Q 30/00 705/27.1 |

OTHER PUBLICATIONS

Jul. 2010—http://www.webdesignerdepot.com/2010/07/20-demos-showing-advanced-jquery-effects/.*

* cited by examiner

*Primary Examiner* — Matthew Zimmerman
(74) *Attorney, Agent, or Firm* — Foley & Lardner LLP; Shabbi S. Khan; Christopher J. McKenna

(57) ABSTRACT

The present solution relates to an improved system and method for providing interactive content. The present solution can provide a first content object for display in a content slot of an information resource of a content provider. The first content object can include one or more tags that can each be linked to a respective second content object of a plurality of second content object. When an interaction is received with a first tag the system can identify a second content object corresponding to the first tag. The second content object can be provided for display in the same content slot of the information resource. In some implementations, the second content object can include a transaction interface to purchase an item identified in the second content object.

12 Claims, 9 Drawing Sheets

SYSTEMS AND METHODS FOR GENERATING INTERACTIVE CONTENT FOR IN-PAGE PURCHASING

FIELD OF THE INVENTION

The present disclosure relates to systems and methods for providing interactive content. In particular, the present disclosure relates to methods and systems providing interactive content that can enable in-page purchasing from multiple vendors without navigating to each of the multiple vendor websites.

BACKGROUND OF THE INVENTION

To receive additional content or information about items displayed in a webpage, a browser of a computing device is typically navigated away from the webpage to a second webpage. In other examples, websites may curate and display items for sale by different vendors. If the viewer of the curated website wants to purchase any of the items displayed on the curated website they must navigate to the individual websites of the different vendors to complete the purchase.

BRIEF SUMMARY OF THE INVENTION

The present solution disclosed herein is directed to methods and systems for providing interactive content, which can enable in-page purchasing of items displayed on the webpage. A content publisher can publish a web page that includes one or more third-party content slots. The third-party content slots can be configured to display third-party content received from one or more third-party content providers. The retrieved third-party content, such as ads, can be linked to landing pages that redirect the browser away from the content publisher to a webpage of the advertiser. As a result, users are taken away from the content publisher's webpage to the advertiser's webpage. This adversely affects the content publisher's ability to engage with visitors on their webpage.

Accordingly, the present disclosure relates to methods and systems for providing interactive content that can be displayed within a content slot of a webpage and allows for additional engagement with the interactive content without leaving the page. In some implementations, the content object can include a first container and a second container and can be configured to display the content included in either the first container or the second container within the content slot. The first container can include at least one image that include one or more tags. Each of these tags can be linked to a corresponding content item included in the second container such that when a user clicks or interacts with one of these tags, the content object causes the corresponding content item included in the second container to be displayed within the content slot. The corresponding content item can also include an image but may be displayed with an interface through which the user can perform additional functionality, for instance, make a purchase.

According to one aspect of the disclosure, a method for providing interactive content, includes providing, for display on a computing device, by a server of a content provider, a first content object in a content slot of an information resource of the content provider. The first content object can include one or more tags. Each of the one or more tags can be linked to a respective second content object of a plurality of second content objects. The method can also include receiving, by the server, a first interaction with a first tag of the one or more tags, and then responsive to receiving the first interaction with the first tag, identifying a second content object corresponding to the first tag. The method can further include providing, for display in the same content slot, by the server, the identified second content object corresponding to the first tag. The second content object can include a transaction interface to purchase an item identified in the second content object. The transaction interface can include a transaction content object configured to cause the computing device to provide, to the server, a request to update a shopping cart maintained by the server and associated with the computing device.

The method can also include, responsive to receiving a second interaction with the transaction content object, updating the shopping cart to include the item corresponding to second content object. In some implementations, the first content object can include an image. The image can include one or more items for purchase, and the first tag can be positioned on the item in the image and linked to the second content object. The second content object can include a plurality of item images. The second content object can be configured to display a first item image of the plurality of item images and include a selection object to select a second item image of the plurality of item images for display. The method can also include, responsive to receiving an interaction on the selection object, providing, for display, the second image within the content slot of the information resource.

In some implementations, the first content object and the second content object can be included in an interactive content object. The interactive content object can include a first container that can include the first content object and a second container that can include the second content object. The first content object can also include a script to cause the computing device to display the second content object responsive to receiving an interaction with a tag of the first content object linked to the second content object.

The method can also include identifying, by the server, an identity of the tag associated with the interaction, and selecting, by the server, the second content object linked to the tag. The second content object can then be transmitted to the computing device for display within the same content slot. When providing, for display in the same content slot, by the server, the respective second content object, a flip transition can be displayed between the display of the first content object and the second content object in the content slot. In some implementations, when a width of the display is below a predetermined threshold, the flip transition is along a horizontal axis and when the width of the display is above the predetermined threshold the flip transition is along a vertical axis.

According to another aspect of the disclosure a system for providing interactive content includes one or more processors and a memory storing computer executable instructions that when executed cause the one or more processor to provide, for display on a computing device, a first content object in a content slot of an information resource of the content provider. The first content object can include one or more tags. Each of the one or more tags can be linked to a respective second content object of a plurality of second content objects. Execution of the computer executable instructions can also cause the one or more processors to receive a first interaction with a first tag of the tags and identify a second content object corresponding to the first tag. The one or more processors can also provide, for display in the same content slot the identified second content object corresponding to the first tag, the second content object. The second content object can include a transaction interface to purchase an item identified in the second content object. The transaction interface can include a transaction content object configured to cause the computing device to provide, to the server, a request to update a shopping cart maintained by the server and associated with the computing device.

In some implementations, the computer executable instructions can further cause the one or more processors to, responsive to receiving a second interaction with the transaction content object, update the shopping cart to include the item corresponding to second content object. The first content object can include an image. The image can include one or more items for purchase. The first tag can be positioned on the item in the image and linked to the second content object.

In some implementations, the second content object can include a plurality of item images. The second content object can be configured to display a first item image of the plurality of item images and include a selection object to select a second item image of the plurality of item images for display. Responsive to receiving an interaction on the selection object, the computer executable instructions can cause the one or more processors to provide, for display, the second image within the content slot of the information resource.

The first content object and the second content object can be in an interactive content object. The interactive content object can include a first container that can include the first content object and a second container that can include the second content object. The first content object can include a script to cause the computing device to display the second content object responsive to receiving an interaction with a tag of the first content object linked to the second content object.

In some implementations, the computer executable instructions can cause the one or more processors to identity of the tag associated with the interaction, select the second content object linked to the tag, and transmit, to the computing device, the second content object for display within the same content slot. In some implementations, a transition can be displayed between the display of the first content object and the second content object. In some implementations, when a width of the display is below a predetermined threshold, the flip transition is along a horizontal axis and when the width of the display is above the predetermined threshold the flip transition is along a vertical axis

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
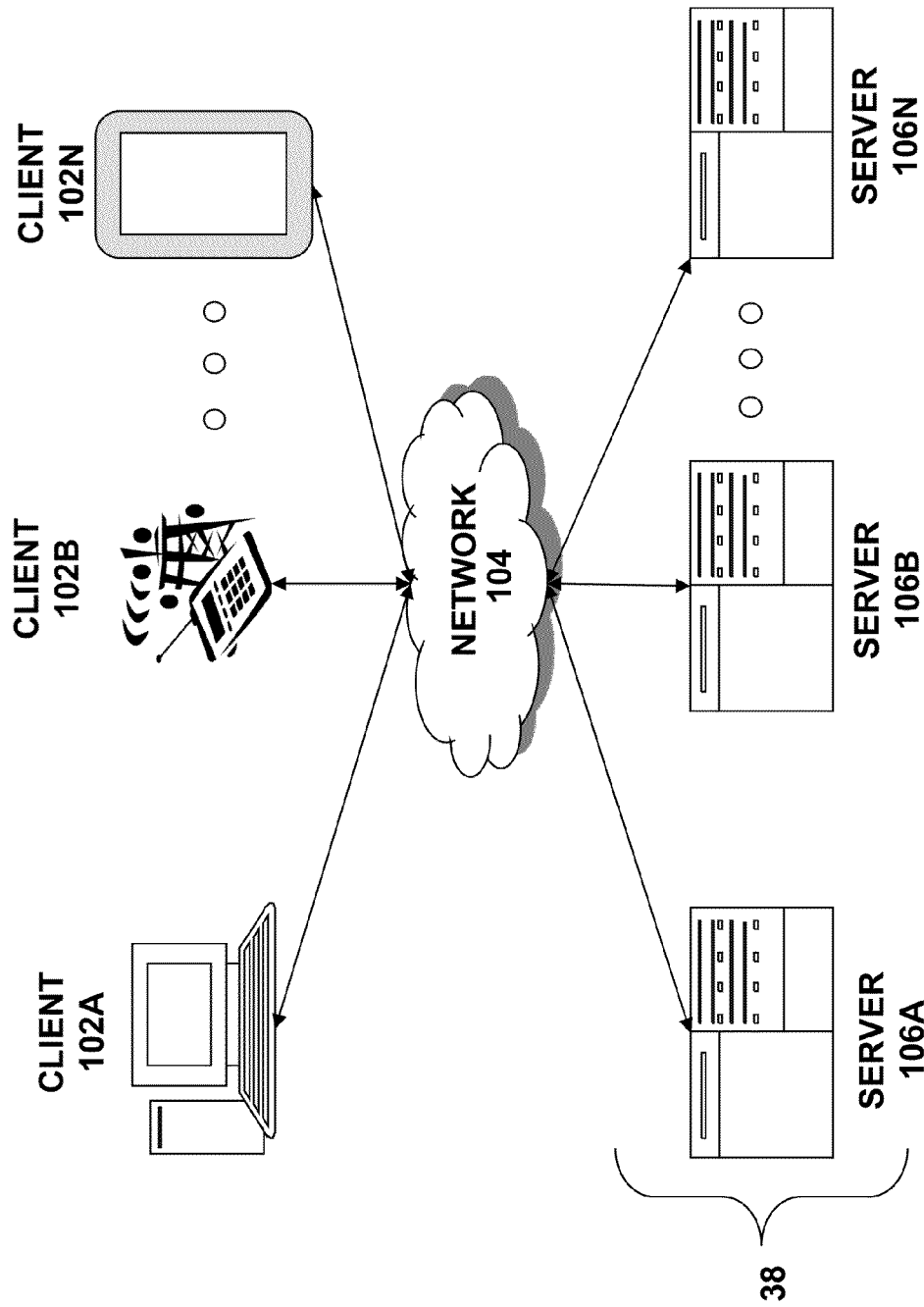
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following enumeration of the sections of the specification and their respective contents may be helpful:

Section A describes a network and computing environment which may be useful for practicing embodiments described herein; and Section B describes embodiments of a system and method for providing interactive content.

A. Network and Computing Environment

Prior to discussing the specifics of embodiments of the systems and methods, it may be helpful to discuss the network and computing environments in which such embodiments may be deployed, including a description of components and features suitable for use in the present systems and methods. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS 7 or 8, manufactured by Microsoft Corp. of Redmond, Wash., UNIX, LINUX, or OS X.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
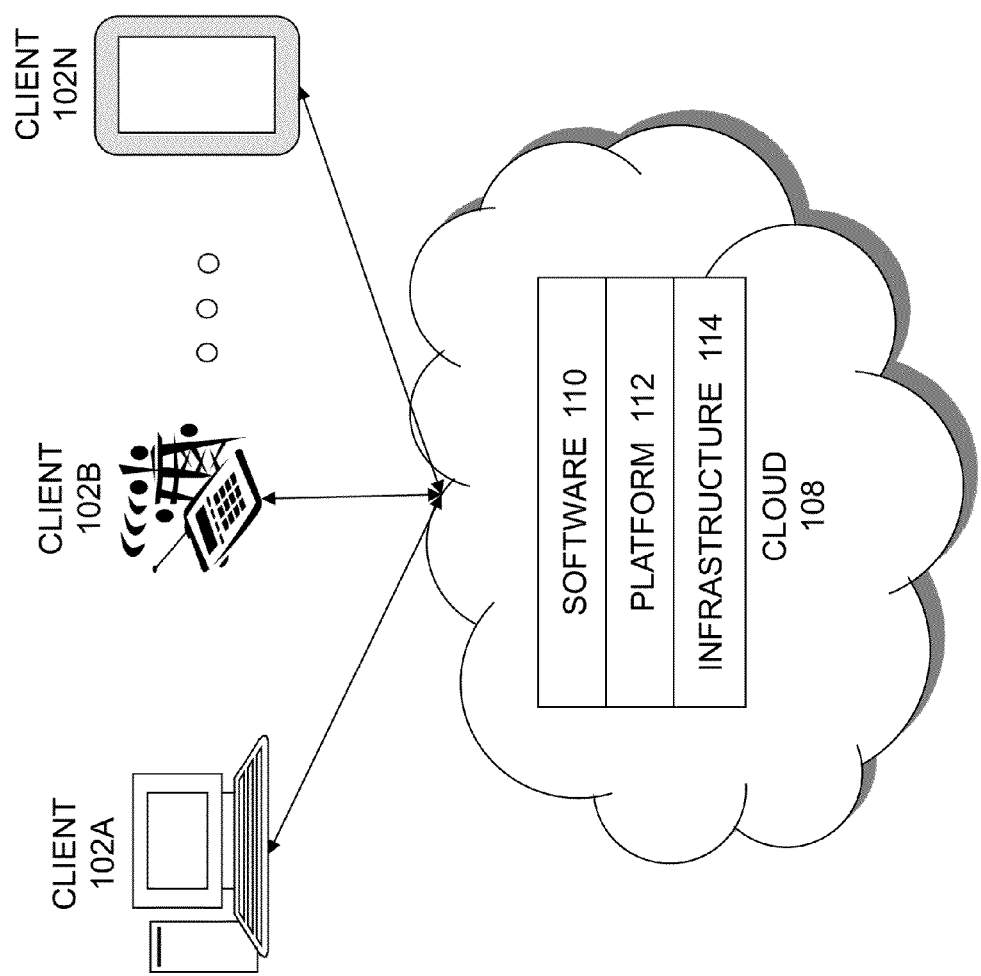
FIGS. 1B-1D are block diagrams depicting embodiments of computers useful in connection with the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and an interactive content module (ICM) 120. The I/O controller 123, in some embodiments, is further connected to a key board 126, and a pointing device 127. Other embodiments may include an I/O controller 123 connected to more than one input/output device 130A-130N.

Figure 1C:
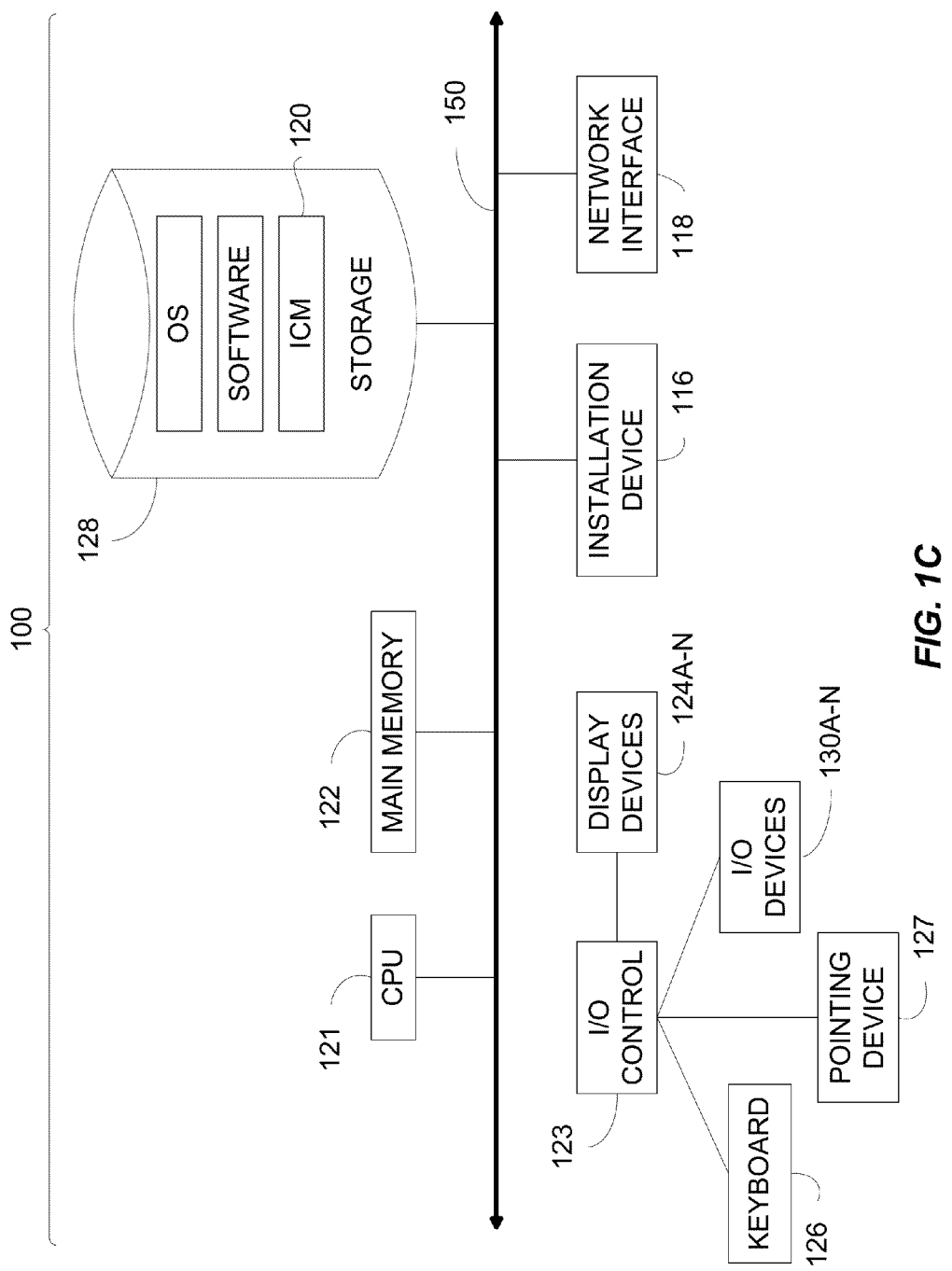
Figure 1D:
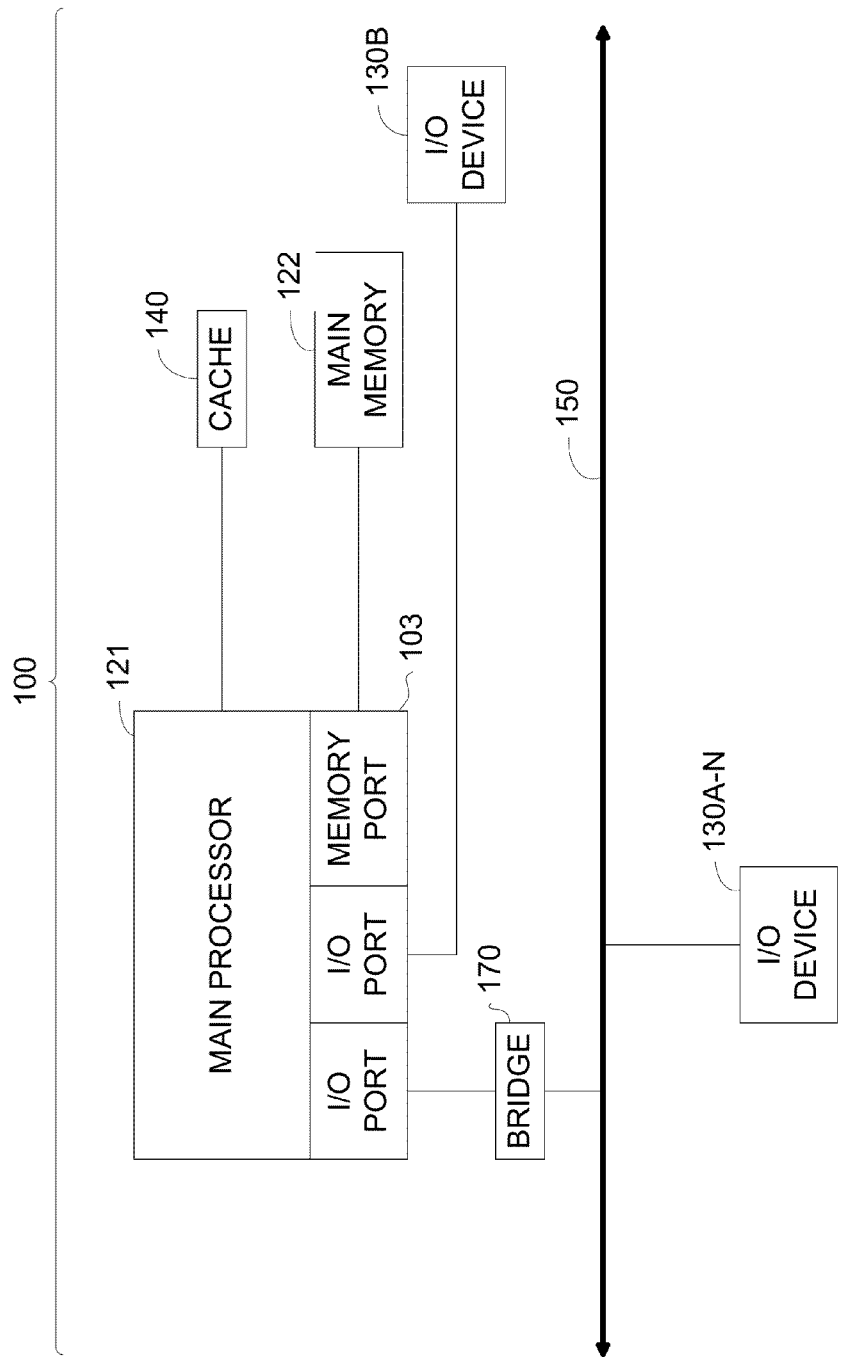

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. System and Method for Providing Interactive Content

The present solution relates to a system and method for providing interactive content. The interactive content may be provided as part of a webpage viewed on a client device such as a laptop, computer, tablet, smartphone, or other computing device. In some implementations, the system and method can be used to provide additional information to a user. For example, a webpage can be configured to include an interactive content object, which can include a first, forward-facing container and a second backward-facing container. A first content object, such as an image, can be loaded into the forward-facing container. Items of interest in the image can be identified with clickable or otherwise selectable tags. Each of the tags can be linked or otherwise related to secondary content objects that can provide additional content related to the item identified by the respective tags. When a user selects one of the tags, the secondary content object associated with the tag can be loaded into the backward-facing container. A script associated with the interactive content object can flip or rotate the interactive content object, which causes the backward-facing container to now face forward and display the content of the secondary content object.

In some implementations, the secondary content object can include a transaction object that enables the item identified by the selected tag to be added to a digital shopping cart. The digital shopping cart can be maintained by a server providing the web page to the client device. For example, each of the secondary content objects can be associated with items sold by different vendors. Rather than navigating to each of the vendor's website to purchase the item, the user can add the item to the shopping cart through interacting in-page with the transaction interface of the secondary content object. In this way, a user does not have to leave the page on which the interactive content object is shown to purchase items displayed in the first content object.

Figure 2A:
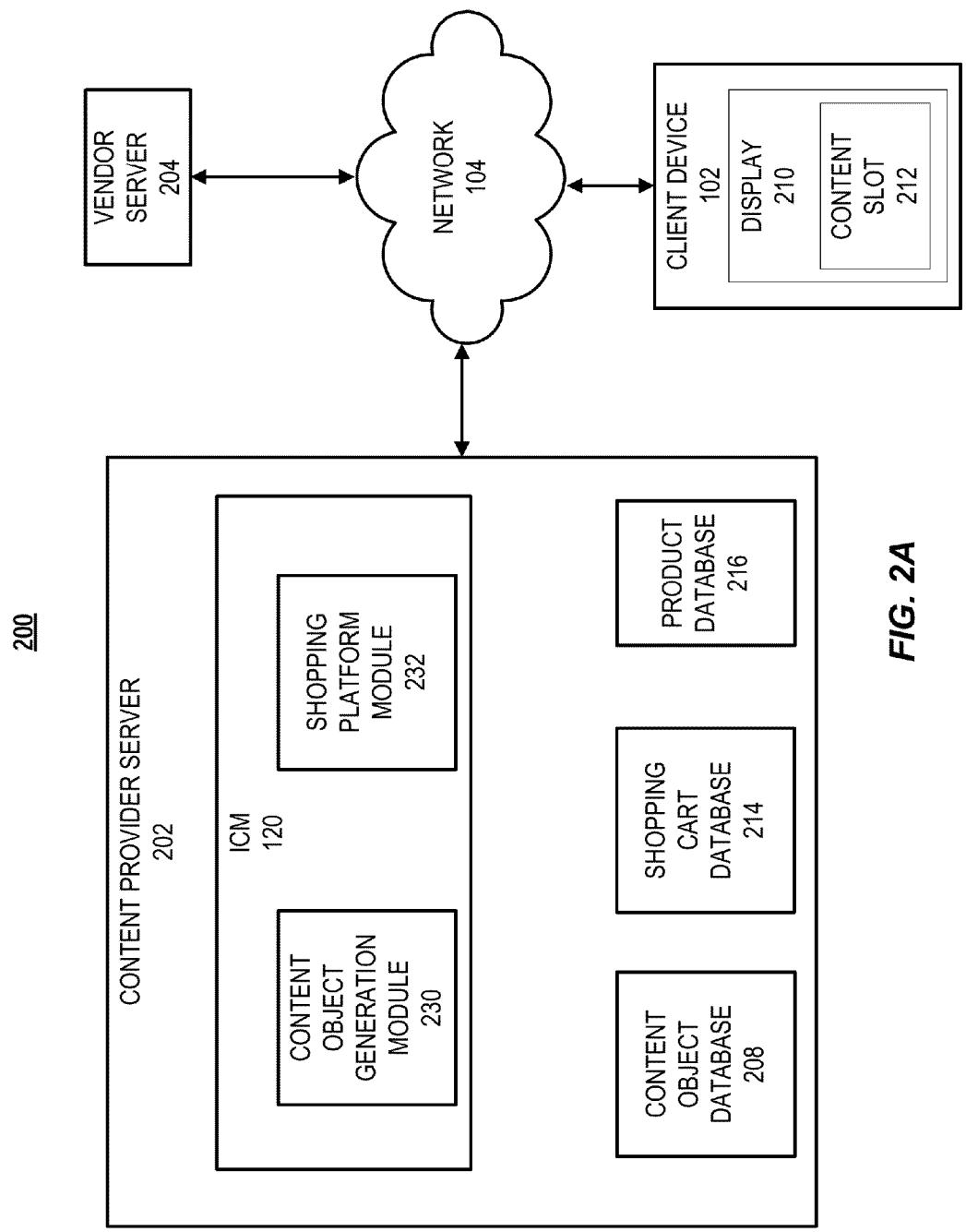
FIG. 2A is a block diagram of a system for providing interactive content.
Figure 2B:
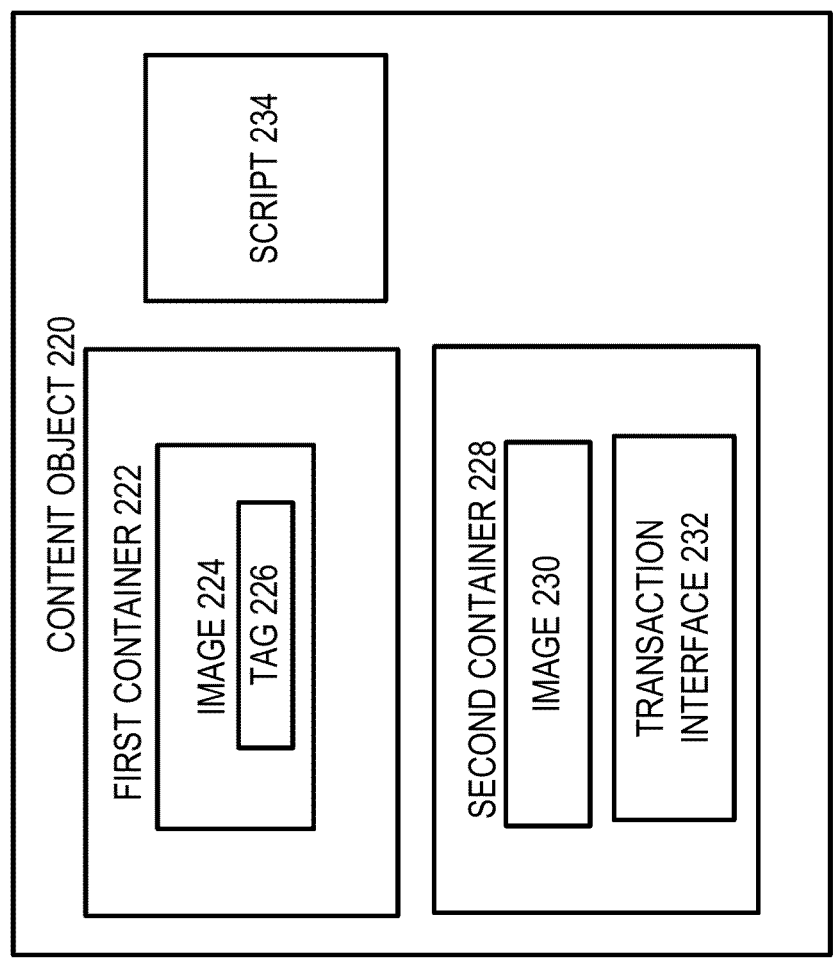
FIG. 2B is a block diagram of an interactive content object.

FIG. 2A is a block diagram of a system 200 for providing interactive content. The system 200 includes a content provider server 202 (or generally server 202) in communication with at least one client 102 through a network 104. One or more vendor servers 204 can be in communication with the client 102 and the server 202 via the network 104. FIG. 2B is a block diagram of an interactive content object. Referring briefly to FIG. 2B, the content object 220 can include a first container 222 and a second container 228 and a script for executing the functionality of the content object. The content object can be displayed within one or more content slots defined within web pages, mobile application pages, or other information resources. The content object 220 can be configured to be sized to fit within boundaries of a content slot.

The first container 222 can include at least one image 224 and at least one tag 226 included in the image 224. When a content object, such as the content object 220, is first displayed within a content slot, such as the content slot 212, contents of the first container are provided for display in the content slot. In some implementations, the image 224 can be displayed. The image can include one or more tags 226. The tags can include visual identifiers that include links to respective content items contained within the second container 228. The content, for example the image 224, included in the first container can be referred to as primary content.

The second container 228 can include one or more second content items, such as one or more additional images 230. The content included in the second container can be referred to as secondary content, for example, the image 230, as the image 230 is linked to a tag displayed on the primary content 224. Each of the images 230 is associated with at least one of the tags of the first container. The second container can also include text, or other content that may be related to one or more of the images. As will be described below, the content object may be configured to allow users to purchase items via the content objects. In some such implementations, the second container can include content from third-party sources, including but not limited to images, product details, shipping information, or other content that may be displayed to the user within the content object. In addition, the second container can include a transaction interface that is configured to be displayed with other content of the second container. The transaction interface can communicate with other components of the server 202, including but not limited to a product database 216 which may include a list of inventory of products available for purchase, as well as other product related details. The transaction interface can be configured to allow a user to purchase a product corresponding to each of the images of the second container.

The content object 220 further includes a script 232. The script can be any file, program, application, set of instructions or computer-executable code that is configured to enable the computing device on which the content object is displayed to allow a user to interact with the content object while the content object is displayed within the content slot. In some implementations, the script is in a JavaScript Object Notation (JSON) format.

The script 234 can be configured to cause a computing device to display an image, such as the image 224, in a content slot of an information resource. The script can be configured to identify one or more tags 226 corresponding to the image 224 and position the tags 226 at designated locations on the image 224. The script can be configured to display one or more additional images stored in the first container 222 responsive to receiving an indication from a user or according to a predetermined time or activity based schedule. For instance, the script can be configured to cause a different image included in the first container to be displayed at predetermined time intervals. In some implementations, the script can be configured to cause a different image included in the first container to be displayed each time the page is reloaded or if some other activity is performed.

The script 234 can be configured to cause the computing device on which the content object is displayed to identify if a cursor or other input device has interacted with a particular tag. In some implementations, the script can implement a listening agent that is configured to listen for or identify any activity relating to the cursor or other input device. In some implementations, the listening agent can identify activity performed on a display screen, or via an input device configured to communicate with the computing device. The script can be configured to cause the computing device to determine if the interaction qualifies as a first interaction. If the computing device determines that the interaction qualifies as the first interaction, for example, a hover over a tag, the script can cause the computing device to display additional content included in the first container. The additional content can be linked to the tag and can include an image, text, among others. The additional content can be displayed as a pop up over the tag responsive to determining that a first interaction with the particular tag took place. The additional content can be stored in the first container and information associating the additional content with the particular tag can be stored. In some implementations, a file can be maintained in the first container that links one or more of the tags to additional content stored in the first container, such that when a first interaction is performed on one of the tags, the appropriate additional content can be provided for display as an overlay over the image 224.

The script 234 can be configured to cause the computing device to determine if the interaction qualifies as a second interaction, for example, a click on a tag. The script can cause the computing device to display content from the second container instead of the first container. The script can be configured to cause the computing device to identify the content item, for example the image 230, of the second container 228 that is linked to the tag of the first container 222 that received the second interaction (or click). The script can further be configured to cause the computing device to display the transaction interface 232 along with the image 230 within the same content slot in which the image 224 of the first container 222 was displayed.

The script 234 can be configured to cause the computing device to further include additional instructions to receive instructions to add a product associated with the image 230 to a shopping cart, and update, via the transaction interface 232, the shopping cart associated with the browser or computing device on which the interactive content object 220 is displayed in response to receiving the instructions. Additional details relating to the shopping cart are described below.

In some implementations, Cascading Style Sheets (CSS) can be used to configure the interactive content object such that the second container "faces backwards" with respect to the first container. When a container is facing backwards, the content of the container is not displayed by the client 102. Responsive to a qualifying action by the user on a tag displayed in a content object of the first container, the interactive content object can transition from displaying the contents of the first container to displaying the contents of the second container. The transition can be a flip transition, which causes the interactive content object to alternate which container faces forward. In some implementations, the flip is made along a vertical axis of the display and in other implementations, the flip is made along a horizontal axis of the display. The flip can be made along a horizontal axis when a script associated with the interactive content object determines the width of the application is below a predetermined threshold, and the flip can be along a vertical axis when the script associated with the interactive content object causes the computing device to determine the width of the application is above the predetermined threshold. In some implementations, the script can include PHP, javascript, CSS, or a combination thereof. For example, the script can include javascript that is executed by the client 102 to manipulate the CSS classes—causing the interactive content object to flip or rotate.

In some implementations, the content object may include links to images. In this way, instead of having to transmit a content object that includes a large number of images (which may be resource intensive), the content object can include links to images. In some such implementations, the tags can be linked to images that are not included in the content object but are accessible by the content object. In this way, in the event that an image is to be accessed (in response to an action taken on a tag), the script can be configured to cause the computing device to send a request to the server 202 to retrieve the image corresponding to the link.

Referring again to FIG. 2A, the server 202 is in communication with the client 102 via the network 104. The server 202 includes one or more processors that execute the ICM 120, which can include a content object generation module 230 and a shopping platform module 232. The server 202 also includes a content object database 208, a shopping cart database 214, and a product database 216.

The ICM 120 can include any program, script, file, configuration or computer executable instructions to provide interactive content. In some implementations, the ICM 120 can receive interactive content from one or more vendor servers or other content provider servers. In some implementations, the ICM 120, via the content object generation module 230, can generate the content object.

The content object generation module 230 can include computer executable instructions, which can cause the server 202 to generate the interactive content object. In some implementations, the content object generation module 230 can generate the interactive content object. The content object generation module 230 can be configured to provide, to an entity, a user interface through which the entity can provide content for generating the content object. Via the interface, an entity can provide, to the server 202, one or more images to include in the first and second containers of the content object. The user can identify which images are to be included in the first container and which images are to be included in the second container. The content object generation module 230 can, via the interface, display images of the first container on which tags are to be included. The content object generation module 230 can, via the interface, receive input from the entity, relating to locations on the images at which to place the tags. A user can identify the location at which to place a tag by, for example, clicking at a particular location on the image. The user can then identify one or more other images to associate with the tag. The other images can include images that may be displayed in response to a hover over (or first interaction), or images that may be displayed in response to a click (or second interaction). In some implementations, images displayed in response to the second interaction can be stored in the second container.

The content object generation module 230 can store the location of the tags identifying pixel coordinates at which the tags are selected to be positioned. In some implementations, the content object generation module 230 can store the location of the tags based on a relative distance from one or more landmarks on the image, for example, the corners of the image. In this way, in the event that the image is displayed at different sizes, the tags are positioned at the right location on the image based on the size of the image. The content object generation module 230 can further configure to generate a script based on the tags and each of the images linked to the tags. In this way, when the content object is displayed and a tag is clicked on, the script can determine and display the image associated with the tag.

In some implementations, the content objects can be generated on a server other than the server 202. In some such implementations, the server 202 can receive the content objects via the network 104, and store the content objects in the content object database 208. The content objects stored in the content object database 208 can be content suitable for display on a webpage, mobile application, or computer application and can be provided to the server 202 in any suitable data structure or format.

In some implementations, the content object can be used to purchase items included in one or more images included in the content object via the content object. To do so, the server 202 can utilize the shopping platform module 232. The shopping platform module 232 can be configured to maintain an inventory of items available for purchase via the interactive content objects. In some implementations, the shopping platform module 232 can maintain a list of all available products, including product related information. In some implementations, the server 202 can be configured to sell furniture and other home related goods. As such, the inventory can include a list of furniture, art, and other home accessories. The shopping platform module may maintain a product database 216 that includes the list of inventory. In some implementations, the product database 216 can include, for one or more of the items available for sale, a vendor through which the sale will be complete. For instance, the content provider may sell furniture on behalf of one or more vendors. In some such implementations, the vendor servers may communicate via APIs with the server 202 to update the product database 216 that maintains the list of inventory. In some implementations, the server 202 can sell products that are acquired from one or more of the vendors corresponding to the vendor servers 204. In some such implementations, the server can buy these products from the vendor and then resell them via the content objects.

The content provider may purchase inventory from one or more of the vendors, which the content provider can then resell via a website of the content provider. The content provider can provide for display, on a web page of the content provider, a content object that includes images, text, and other data related to one or more items of the inventory for sale. The content object can be generated by the vendor, content provider, or a combination thereof. In an example where the vendors each are furniture retailers, the content object can include an image of a staged room that is decorated using the furniture and accessories associated with the vendors and which the content provider can sell to the user of the client 102. The content object can be generated by the content provider and may include photographs of a staged room. In some implementations, the content object that the user of the client 102 may want additional information about is referred to as a primary content object and the content objects providing the additional information are referred to as secondary content objects. In another example, the vendors, via the server 202, can sell directly to the user of the client 102. For example, the content provider may not purchase items that are held in inventory and then sold to the user of the client 102, but the secondary content items can interface with each of the vendor servers 204 to enable in-page purchasing.

In some implementations, the shopping platform module 232 provides an interface the vendors can use to provide the content objects to the server 202. For example, the shopping platform module 232 may provide a website that enables the vendors or other third parties to provide indications of products the vendors wish to be listed for sale on a content publisher's website. In some implementations, the shopping platform module 232 can expose functions for receiving content objects to the vendor servers 204 through an application program interface (API)—such as a REST API.

In some implementations, the product database 216 can include information related to each of the items associated with the tags. For example, the items associated with each of the tags can be sold by or through the content provider's website. The server 202 can store inventory information, vendor information, pricing information, and other data related to the item in the product database. In some implementations, the tags included in the content object can provide links back to the product database 216, which enable scripts in the content object 220 to pull information from the product database 216 for placement in the content object 220.

As described further below, in some implementations, the system 200 can be used to purchase items offered by the vendor server 204 while remaining on a website hosted by the content provider server 202. The server 202 can also include a shopping cart database 214 to maintain a shopping cart associated with the client 102. For example, as the user of the client 102 interacts with the content objects and indicates a desire to purchase an item corresponding to one of the secondary content objects, a request can be sent to the ICM 120 of the server 202 by the client 102 that updates the entry of the shopping cart database 214 associated with the client 102 or the user thereof to include the item corresponding to the secondary content object. When the user of the client 102 completes the order on the website hosted by the server 202, the ICM 120 can transmit the purchasing information to each of the corresponding vendor servers 204.

The system 200 also includes a client 102 that receives the content object from the ICM 120 of the server 202. The client 102 displays the received content object via the display 210. The content object 220 is displayed in a content slot 212. The content slot 212 can be a slot in a webpage or application for displaying content (generally referred to as an information resource). As described above with respect to FIG. 2B, the content object 220 can include containers into which primary and secondary content objects are loaded. In the context of a webpage, when the user desires additional information or wishes to purchase an item in the primary content object, the user can click on a tag associated with the item. Clicking the tag can cause the secondary content object associated with the item to be displayed. Accordingly, the user can receive additional information or purchase the item in-page and without navigating to a different website.

In the context of an application (e.g., a smartphone application or a computer application), when the user desires additional information or wishes to purchase an item in the primary content object, clicking the tag can cause the secondary content object to be displayed without displaying a second page or switching to a different application. The client 102 is configured to receive interactions from a user either through the user touching a touch sensitive display 210 or by the user selecting (or clicking) through the use of an interactive device (e.g., a mouse). For example, one interaction the client 102 may detect is the selection by the user of a tag positioned on the content object displayed in the content slot 212.

In some implementations, as illustrated in FIG. 2A, the content provider is also the content publisher. The content publisher can be an entity that provides an information resource to the client device for display. The information resource of the content publisher can include the content slot in which a content object can be displayed. In some implementations, the content object can be a content object that is generated or created by the content publisher. In some other implementations, a content provider can generate or create the content object and send it to the content publisher or to the client device directly for display in the content slot of the information resource. For example, the content publisher may be a social media content publisher (e.g., a social media website publisher) that publishes content received from third parties. The content provider may provide the content objects and other instructions for displaying the content objects in a content slot of the social content publisher. In some implementations, the content provider may provide the content objects to the content publisher as a component of an advertisement, article, or other form of web content.

Figure 3:
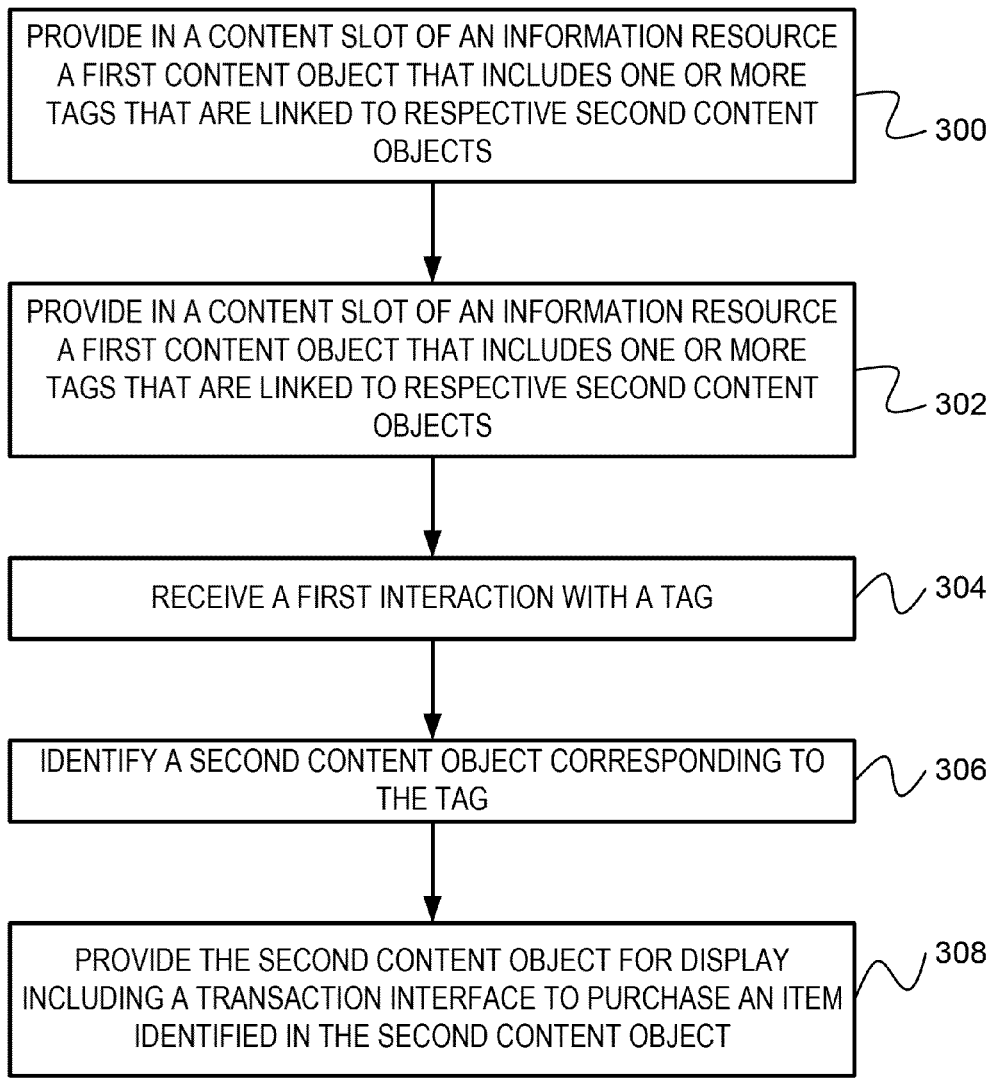
FIG. 3 is a block diagram depicting an implementation of providing interactive content using the system illustrated in FIG. 2A.

FIG. 3 is a block diagram depicting an implementation of providing interactive content using the system described in relation to FIG. 2A. The method includes identifying a content object to display in a content slot of an information resource at a client device (BLOCK 300). The method also includes providing for display in a content slot of an information resource a first content object that includes one or more tags that are linked to respective second content objects (BLOCK 302). The method also includes receiving a first interaction with a tag (BLOCK 304). A second content object is identified response to receiving the first interaction (BLOCK 306). The method also includes providing, for display in the same content slot, by the server, the identified second content object corresponding to the first tag (BLOCK 308). The second content object can include a transaction interface to purchase an item identified in the second content object. The transaction interface can include a transaction content object configured to cause the computing device to provide, to the server, a request to update a shopping cart maintained by the server and associated with the computing device.

As set forth above, and also referring to FIG. 2A,

The method includes identifying a content object to display in a content slot of an information resource at a client device (BLOCK 300). In some implementations, the content object is selected for display in a content slot by the content provider that provides the information resource. In some implementations, the content slot can be configured to request content from a third-party content provider. In some implementations, the content slot can be configured to request content via a content selection server, such as an ad server. The content provider can select, based on the content of the information resource, a suitable interactive content object to display within the content slot. In some implementations, the interactive content object can be selected based on bids received for displaying content in the content slot. In some implementations, the information resource is coded to receive a particular content object. In some implementations, the content object to be displayed in the content slot is stored in the content object database maintained by the server 202.

Responsive to identifying the interactive content object to display in the content slot, the method includes providing, for display in the content slot of the information resource, a first content object of the interactive content object that includes one or more tags that are linked to respective second content objects (BLOCK 302). The first content object is selected from one of the images included in the first container of the interactive content object. In some implementations, the first content object can be designated as the content object to display when the interactive content object is provided for display in the content slot. In some implementations, the server 202 can provide the interactive content object to the client for display in the content slot. In some implementations, the server 202 can provide only the first content object included in the first container along with one or more tags associated with the first content object. Responsive to the client device receiving the first content object or the interactive content object, the client device can display the first content object along with the one or more tags associated with the first content object. In some implementations, a plurality of primary content objects can be provided for display. For example, when a plurality of primary content objects are provided, the user of the client 102 can scroll or swipe through each of the primary content objects—each of which can include a plurality of tags.

Figure 4:
FIG. 4 illustrates a content slot displaying a content object using the system illustrated in FIG. 2A.

FIG. 4 illustrates a content slot 212 displaying a content object 402. FIG. 4 illustrates an application 400 (e.g., a web browser) that is displayed by, for example, the client 102. The application 400 renders a webpage that can include the content slot 212. A primary content object 412 is displayed in the content slot 212. As illustrated in FIG. 4, the content object 412 is an image that includes a number of items. Tags 404 are positioned over a plurality of the items illustrate in the image of the content object 412. As described above, each of the tags 404 can be associated with a position that indicates where on the image of the first content object 412 the tag 404 should be rendered. Each of the tags 404 can be linked to or otherwise associated with a respective secondary content object. In some implementations, the first content object 412 is associated with, references, or includes items offered for sale by the content provider 202 or the vendor servers 204. As illustrated in FIG. 4, the content object 412 includes furnishings and decorations that are available for purchase via the content provider 202. A tag 404 is placed over each of the items in the image of the first content object 412.

Referring again now to FIG. 3, the method includes receiving, by the server 202, a first interaction with a tag (BLOCK 304). In some implementations, the first interaction can be a click on the tag. The tags can be links to secondary content items that are included in a second container of the interactive content object. The tags 404 are included as links in the content slot 212 over the items to which they are associated in the content object 402. The tags 404 are selectable (e.g., clickable with a mouse pointer or touchable with a touchscreen enabled client 102). Once the user selects one of the tags 404, a first interaction can be transmitted to the server 202 by the client 102. The first interaction can provide an indication to the server 202 of which tag 404 was selected by the user.

The method also includes identifying a second content object response to receiving the first interaction (BLOCK 306). As described above, each of the tags can be stored in the content object database 208 in association with at least one primary content object and a secondary content object. Responsive to the server identifying the tag on which the first interaction was performed, the server 202 can search the content object database 208 for the secondary content object associated with the selected tag. In some implementations, the secondary content object can include an image of a product as well as additional information related to the product in the primary content object to which the tag 404 is also associated. For example, the tag 404 may be placed over a lamp illustrated in an image of the primary content object 402. Receiving an indication that the user selected the tag above a lamp, the server 202 may search for the secondary content object associated with the respective tag placed above the lamp by performing a SQL query, using a lookup table, a search tree, or by using the tag as a key to lookup the secondary content object in a table. The secondary content object can include additional images of the lamp and can include text based information such as dimensions, price, color, materials, etc. related to the lamp.

Responsive to identifying the second content object, the secondary content object is provided for display (BLOCK 308). The secondary content object can be provided to the client 102 by the server 202 for display in the same content slot 212 as the first content object was displayed. In some implementations, the second content object is inserted or otherwise loaded into the second container. The interactive content object is then flipped such that the contents of the second container are displayed, while the contents of the first container are no longer displayed. In some implementations, the script of the interactive content object can be configured to cause the computing device to cause the containers to flip.

Figure 5:
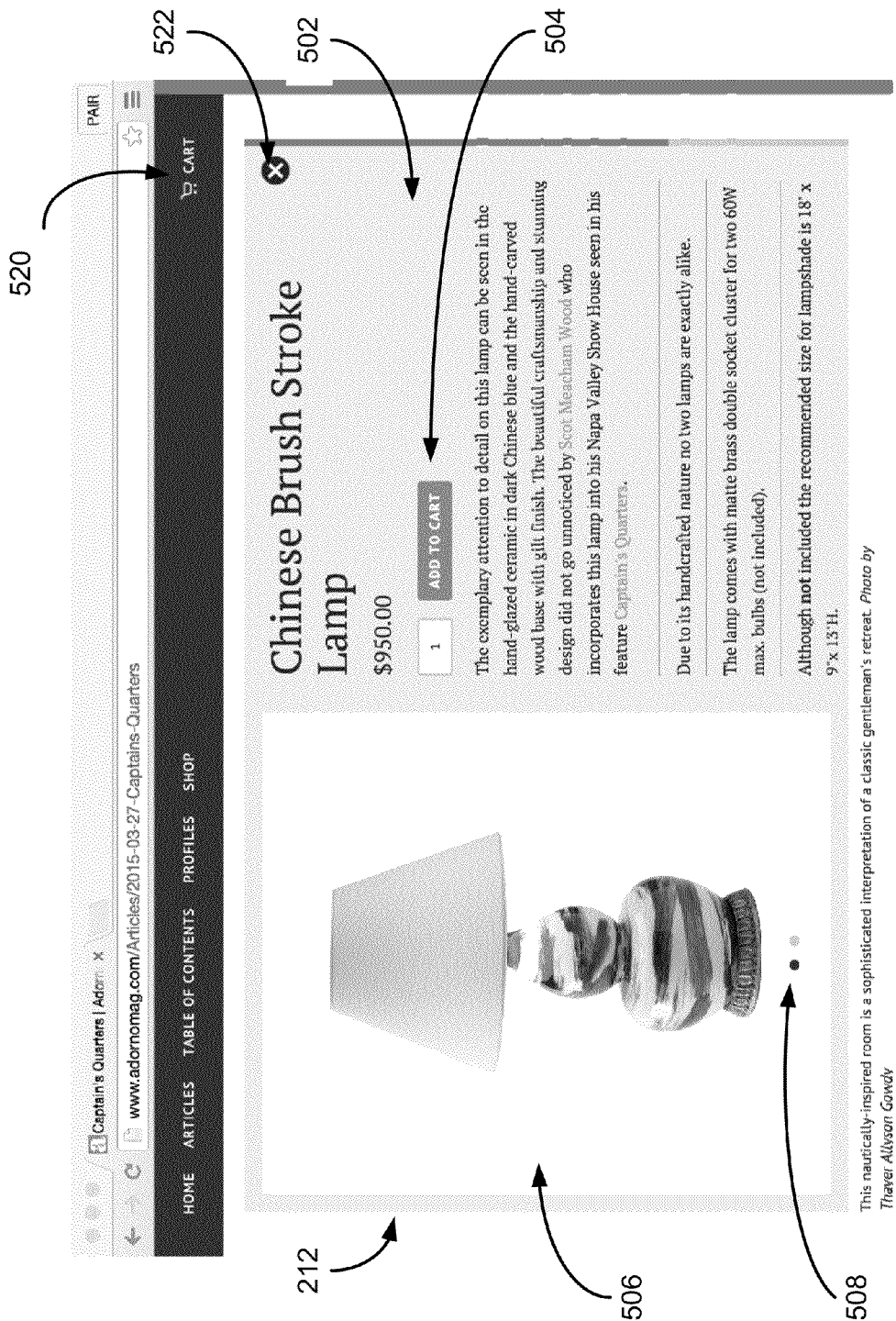
FIG. 5 illustrates a secondary content object displayed in the content slot using the system illustrated in FIG. 2A.

FIG. 5 illustrates a secondary content object 502 displayed in the content slot 212. In this example, the user selected a tag 404 placed above the lamp shown in FIG. 4. The secondary content object 502 includes additional information about the lamp that was illustrated in the image of the primary content object. The additional information included in the secondary content object 502 can include a plurality of item images 506 and a textual description of the item. The user of the client 102 can select between the plurality of item images 506 by interacting with a selection object 508. For example, the selection object 508 can include an image carousel with arrows, dots, or other markers that enable the user to scroll through the plurality of images. As the user interacts with the selection object 508, the appropriate image of the plurality of item images 506 is displayed in the second container of the interactive content object displayed in the content slot 212.

The secondary content object 502 can include a transaction interface 504. The transaction interface 504 can enable a user to purchase the item identified by the secondary content object 502. The transaction interface 504 can include a transaction content object that includes buttons and user inputs that enable the user to indicate the quantity of the item the user wishes to purchase and to add the item to their digital shopping cart. When the user interacts with the transaction interface 504 the transaction content object of the content slot 212 can update a shopping cart 520 associated with the user of the computing device to include the lamp.

In some implementations, the user can interact with the secondary content object 502 such that the first content object is redisplayed. For example, a close button 522 can be displayed on the secondary content object 502. When the user selects the close button the interactive content object can be flipped to its original state to display the image of the first content object in the content slot 212. Once the first content object is redisplayed, the user can select another tag 404. As described above in relation to BLOCKS 304 and 306, the selection of a new tag 404 can cause the server 202 to provide another secondary content object to the client 102 for display in the content slot 212. As in BLOCK 308, the user can interact with a transaction content object of the transaction interface 504, which can cause a request to be sent to the server 202 to update the user's shopping cart 520 with the object associated with the second content object.

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed is:

1. A method to retain visitors at a first website without having to redirect the visitors to a second website to perform a transaction, comprising:
   defining, for display on a computing device, using a server of a content provider, an interactive content object in a content slot of an information resource of the content provider, the interactive content object including a forward-facing container and a backward facing container;
   loading, by the server, a first content object into the forward-facing container, wherein the first content object includes an image having a plurality of tags, wherein each tag in the plurality of tags is assigned to a respective location within the image and is associated with a respective purchasable item identified within the image;
   receiving, by the server, a first interaction with a first tag of the plurality of tags;
   responsive to receiving the first interaction with the first tag, identifying a second content object corresponding to the first tag, wherein the second content object includes information on the purchasable item associated with the first tag;
   loading, by the server, the second content object into the backward-facing container; and
   providing, for display in the content slot, by the server, the identified second content object within the backward-facing container by a flipping or a rotating of the interactive content object causing the backward-facing container to face forward, the second content object including a transaction interface to purchase the purchasable item associated with the second content object, the transaction interface including a transaction content object configured to cause the computing device to provide, to the server, a request to update a shopping cart maintained by the server and associated with the computing device.

2. The method of claim 1, further comprising responsive to receiving a second interaction with the transaction content object, updating the shopping cart to include the purchasable item associated with the second content object.

3. The method of claim 1, wherein the second content object includes a plurality of item images, the second content object configured to display a first item image of the plurality of item images and include a selection object to select a second item image of the plurality of item images for display; and further comprising:
   responsive to receiving an interaction on the selection object, providing, for display, the second image within the content slot of the information resource.

4. The method of claim 1, further comprising:
   identifying, by the server, an identity of the first tag associated with the first interaction;
   selecting, by the server, the second content object linked to the first tag; and
   transmitting, by the server to the computing device, the second content object for display within the content slot.

5. The method of claim 1, further comprising determining a width of a display of the computing device; and
   responsive to determining that the width of the display is below a predetermined threshold, flipping the interactive content object along a horizontal axis extending along a width of the display.

6. The method of claim 1, further comprising determining a width of a display of the computing device; and
   responsive to determining that the width of the display is greater than a predetermined threshold, flipping the interactive content object along a vertical axis extending along a length of the display.

7. A system for retaining visitors at a first website without having to redirect the visitors to a second website to perform a transaction, the system comprising:
   one or more processors and a memory storing computer executable instructions that when executed cause the one or more processor to:
      define, for display on a computing device, an interactive a content object in a content slot of an information resource of the content provider, the interactive content object including a forward-facing container and a backward facing container;
      load a first content object into the forward-facing container, wherein the first content object includes an image having a plurality of tags, wherein each tag in the plurality of tags is assigned to a respective location within the image and is associated with a respective purchasable item identified within the image;
      receive a first interaction with a first tag of the plurality tags;
      responsive to receiving the first interaction with the first tag, identify a second content object corresponding to the first tag, wherein the second content object includes information on the purchasable item associated with the first tag;
      provide, for display in the content slot the identified second content object within the backward-facing container by a flipping or a rotating of content within the interactive content object causing the backward-facing container to face forward, the second content object including a transaction interface to purchase the purchasable item associated with the second content object, the transaction interface including a transaction content object configured to cause the computing device to provide, to the server, a request to update a shopping cart maintained by the server and associated with the computing device.

8. The system of claim 7, wherein the computer executable instructions further cause the one or more processors to, responsive to receiving a second interaction with the transaction content object, update the shopping cart to include the purchasable item associated with the second content object.

9. The system of claim 7, wherein the second content object includes a plurality of item images, the second content object configured to display a first item image of the plurality of item images and include a selection object to select a second item image of the plurality of item images for display; and wherein the computer executable instructions further cause the one or more processors to:
   responsive to receiving an interaction on the selection object, provide, for display, the second image within the content slot of the information resource.

10. The system of claim 7, wherein the computer executable instructions further cause the one or more processors to:
    identify an identity of the first tag associated with the first interaction;
    select the second content object linked to the first tag; and
    transmit, to the computing device, the second content object for display within the content slot.

11. The system of claim 1, wherein the computer executable instructions further cause the one or more processors to, responsive to determining that a width of a display is below a predetermined threshold, provide the second content object by flipping the interactive content object along a horizontal axis extending along a width of the display.

12. The system of claim 1, wherein the computer executable instructions further cause the one or more processors to, responsive to determining that a width of a display is above a predetermined threshold, provide the second content object by flipping the interactive content object along a vertical axis extending along a length of the display.

* * * * *